United States Patent
Park et al.

(10) Patent No.: US 9,367,377 B2
(45) Date of Patent: Jun. 14, 2016

(54) APPARATUS AND METHOD FOR MONITORING MULTIPLE MICRO-CORES

(71) Applicants: Hyundai Motor Company, Seoul (KR); Kia Motors Corporation, Seoul (KR); Hyundai Autron Company Ltd., Seongnam, Gyeonggi-do (KR)

(72) Inventors: Choong Seob Park, Gyeonggi-do (KR); Hyung Ju Lee, Seoul (KR); Hak Mo Yoo, Gyeonggi-do (KR); Ji Haeng Lee, Gyeonggi-do (KR); Doo Jin Jang, Seoul (KR); Kang Hee Cho, Gyeonggi-do (KR); Si Kwang Lee, Gyeonggi-do (KR)

(73) Assignees: Hyundai Motor Company, Seoul (KR); Kia Motors Corporation, Seoul (KR); Hyundai Autron Company, Ltd., Seongnam, Gyeonggi-do (KR)

( * ) Notice: Subject to any disclaimer, the term of this patent is extended or adjusted under 35 U.S.C. 154(b) by 141 days.

(21) Appl. No.: 14/256,378

(22) Filed: Apr. 18, 2014

(65) Prior Publication Data

US 2015/0178166 A1    Jun. 25, 2015

(30) Foreign Application Priority Data

Dec. 19, 2013    (KR) .................. 10-2013-0159193

(51) Int. Cl.
  *G06F 11/00*    (2006.01)
  *G06F 11/07*    (2006.01)

(52) U.S. Cl.
  CPC ........ *G06F 11/0757* (2013.01); *G06F 11/0724* (2013.01)

(58) Field of Classification Search
  CPC .................................................. G06F 11/1441
  See application file for complete search history.

(56) References Cited

U.S. PATENT DOCUMENTS

| | | | |
|---|---|---|---|
| 5,355,500 A | 10/1994 | Kondou | |
| 5,983,330 A | 11/1999 | Miwa et al. | |
| 7,287,198 B2* | 10/2007 | Foerstner | G06F 11/0757 714/55 |
| 7,305,283 B2* | 12/2007 | Sayama | B60R 16/03 307/10.1 |
| 7,832,002 B2 | 11/2010 | Chevreau et al. | |
| 8,904,222 B2* | 12/2014 | Isogai | G06F 11/073 713/502 |
| 2002/0078390 A1* | 6/2002 | Sumida | G06F 1/3203 713/320 |
| 2008/0162854 A1* | 7/2008 | Hashimoto | G06F 11/1068 711/167 |
| 2010/0306602 A1* | 12/2010 | Kamiya | G06F 11/0757 714/56 |
| 2012/0224486 A1 | 9/2012 | Battestilli et al. | |
| 2015/0052407 A1* | 2/2015 | Fuchigami | G06F 11/0721 714/55 |

FOREIGN PATENT DOCUMENTS

| | | |
|---|---|---|
| JP | 2739786 B2 | 4/1998 |
| JP | 2009-053952 A | 3/2009 |
| KR | 10-1998-0079383 A | 11/1998 |
| KR | 10-0309743 | 9/2001 |
| KR | 10-2013-0056347 | 5/2013 |

* cited by examiner

*Primary Examiner* — Christopher McCarthy
(74) *Attorney, Agent, or Firm* — Mintz Levin Cohn Ferris Glovsky and Popeo, P.C.; Peter F. Corless

(57) ABSTRACT

An apparatus and method for monitoring multiple micro-cores enable one watchdog to monitor a plurality of micro-cores. The multiple micro-core monitoring apparatus includes: a plurality of micro-cores that periodically output clear signals having different pulse waves; and a watchdog that respectively receives the clear signals having different pulse waves so as to determine presence or absence of an error in the micro-cores, and reset an erroneous micro-core.

10 Claims, 6 Drawing Sheets

APPARATUS AND METHOD FOR MONITORING MULTIPLE MICRO-CORES

CROSS-REFERENCE TO RELATED APPLICATION

This application is based on and claims under 35 U.S.C. §119(a) priority of Korean patent application No. 10-2013-0159193 filed on Dec. 19, 2013, the disclosure of which is hereby incorporated in its entirety by reference.

BACKGROUND (a) Field of the Invention

An apparatus and method for monitoring multiple micro-cores are provided, and more particularly, a technology for allowing one watchdog to monitor a plurality of micro-cores.

(b) Description of the Related Art

Generally, an electronic control unit (ECU) mounted to vehicles includes a micro-core monitoring circuit configured to monitor an operation state of the micro-core. However, a vehicle-stability improvement device (for example, an anti-lock brake system (ABS), a traction control system (TCS), an electronic stability control, a vehicle dynamic control (VDC) system, etc.) directly affects safety of a vehicle and occupants during braking and driving of the vehicle. Therefore, if the electronic control unit (ECU) malfunctions, it may result in the occurrence of an accident.

When a micro-core monitoring circuit for use in the ECU detects an abnormal program execution process by monitoring a program execution process of the micro-core, the micro-core monitoring circuit prevents the ECU from malfunctioning, resulting in improved safety of a vehicle and thus its occupants.

Preferably the micro-core is operated in a flexible manner. However, there is a very low possibility that an unexpected problem occurs in the micro-core because of an unknown reason, such that a watchdog periodically monitors the micro-core and recognizes the presence or absence of an error in the micro-core.

FIG. 1 (PRIOR ART) is a conceptual diagram illustrating a conventional micro-core monitoring apparatus.

Referring to FIG. 1, if a micro-core 10 operates normally, the micro-core 10 outputs a pulse-wave clear signal to a watchdog 20. In this case, the micro-core 10 periodically outputs the clear signal within a predetermined time. If the watchdog 20 periodically receives the clear signal from the micro-core 10, the watchdog 20 determines that the micro-core 10 operates normally.

Upon receiving no clear signal from the micro-core 10 within the predetermined time, the watchdog 20 determines the presence of a problem in the micro-core 10. Accordingly, the watchdog 20 outputs a pulse-wave reset signal to the micro-core 10 so as to reset the micro-core 10.

In general, multiple micro-cores are being embedded in most semiconductors. For example, a dual-core or at least four micro-cores may be embedded into the semiconductor. As a result, as many watchdogs as the number of micro-cores can be embedded in the semiconductor so as to monitor individual micro-cores.

The number of watchdogs is identical to the number of multiple micro-cores, and several watchdogs are separately coupled to the multiple micro-cores. The watchdogs can independently check the presence or absence of an error in the multiple micro-cores. However, if the watchdogs are respectively coupled to the micro-cores, the size of a semiconductor device unavoidably increases.

SUMMARY

Various embodiments of the present invention are directed to providing a multiple micro-core monitoring apparatus and method that can obviate problems due to limitations and disadvantages of the related art.

An embodiment of the present invention relates to a technology for integrating a plurality of watchdogs configured to monitor multiple micro-cores into one watchdog, resulting in reduction in size of a semiconductor device.

An embodiment of the present invention relates to a technology for enabling one watchdog monitoring multiple micro-cores to recognize which micro-core encounters an error or problem, such that the watchdog can reset only the erroneous micro-core, resulting in implementation of efficient error checking.

In accordance with one aspect of the embodiment, a multiple micro-core monitoring apparatus includes: a plurality of micro-cores configured to periodically output clear signals having different pulse waves; and a watchdog configured to respectively receive the clear signals having different pulse waves so as to determine presence or absence of an error in the micro-cores, and respectively reset an erroneous micro-core.

In accordance with another aspect of the embodiment, a multiple micro-core monitoring apparatus includes: a micro-core decision unit configured to determine which clear section is used for reception of each clear signal received from a plurality of micro-cores; a micro-core sensing unit configured to detect whether the clear signal from the micro-core decision unit is received from the corresponding micro-core within a predetermined clear section so as to determine presence or absence of an error in the micro-core; and a micro-core returning unit configured to restore and reset an erroneous micro-core in response to an output signal of the micro-core sensing unit.

In accordance with another aspect of the embodiment, a multiple micro-core monitoring method includes: periodically receiving clear signals having different pulse waves from a plurality of micro-cores; respectively receiving the clear signals having different pulse waves, and determining whether the clear signals are input to a predetermined section, thereby determining presence or absence of an error in the micro-cores; and restoring and resetting an erroneous micro-core from among the micro-cores.

It is to be understood that both the foregoing general description and the following detailed description of the present invention are exemplary and explanatory and are intended to provide further explanation of the invention as claimed.

DETAILED DESCRIPTION OF PREFERRED EMBODIMENTS

Reference will now be made in detail to the embodiments of the present invention, examples of which are illustrated in the accompanying drawings. Wherever possible, the same reference numbers will be used throughout the drawings to refer to the same or like parts.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Figure 1:
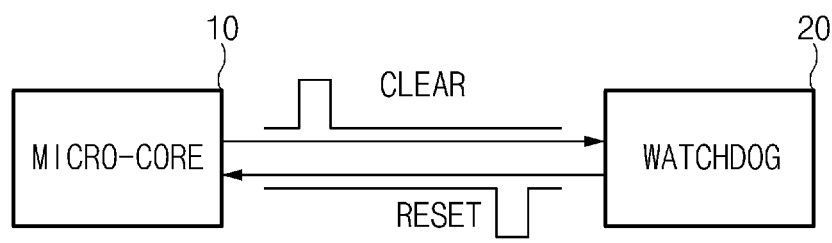
FIG. 1 (PRIOR ART) is a conceptual diagram illustrating a conventional micro-core monitoring apparatus.
Figure 2:
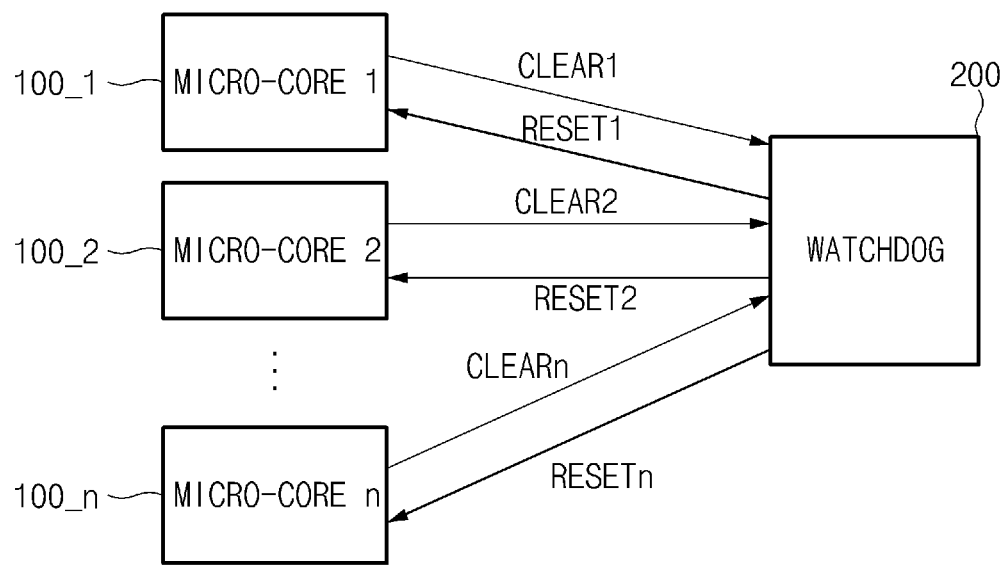
FIG. 2 is a block diagram illustrating an apparatus for monitoring multiple micro-cores according to an embodiment of the present invention.

FIG. 2 is a block diagram illustrating an apparatus for monitoring multiple micro-cores according to an embodiment of the present invention.

Referring to FIG. 2, the multiple micro-core monitoring apparatus includes a plurality of micro-cores ($100\_1$~$100\_n$), and one watchdog 200 shared by the micro-cores ($100\_1$~$100\_n$).

The watchdog 200 can monitor and control each of the micro-cores ($100\_1$~$100\_n$).

In a normal operation mode, all the micro-cores ($100\_1$~$100\_n$) periodically output respective clear signals to the one watchdog 200 within a predetermined time. In particular, the micro-cores ($100\_1$~$100\_n$) can output clear signals having different pulse waves to the watchdog 200.

The watchdog 200 determines that the micro-cores ($100\_1$~$100\_n$) are operating normally upon periodically receiving all clear signals from the micro-cores ($100\_1$~$100\_n$). In this case, the watchdog 200 receives respective clear signals from the micro-cores ($100\_1$~$100\_n$), and can independently determine the presence or absence of an operation error in each micro-core ($100\_1$~$100\_n$).

Upon receiving no clear signals from the micro-cores ($100\_1$~$100\_n$) within a predetermined time, the watchdog 200 determines the occurrence of an unexpected problem in at least one of the micro-cores ($100\_1$~$100\_n$). Accordingly, the watchdog 200 outputs a reset signal to the erroneous micro-core so that this erroneous micro-core can be reset.

In this case, the watchdog 200 can output a reset signal to each of the micro-cores ($100\_1$~$100\_n$), so that the watchdog 200 does not affect the remaining normal micro-cores other than the erroneous micro-core.

In accordance with the above-mentioned embodiment, one watchdog 200 is configured to monitor/reset each of the micro-cores ($100\_1$~$100\_n$). Accordingly, the multiple micro-core monitoring apparatus according to the embodiment includes a plurality of micro-cores ($100\_1$~$100\_n$) and one watchdog 200, such that the size of a semiconductor device requisite for the embodiment can be greatly reduced as compared to the related art including a plurality of micro-cores and a plurality of watchdogs.

Figure 3:
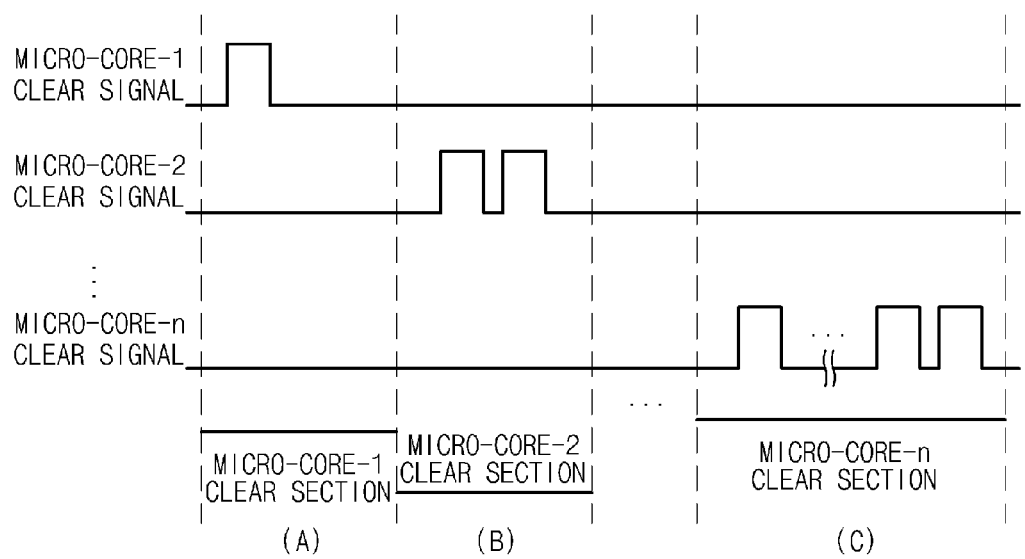
FIG. 3 is a timing diagram illustrating operations of the multiple micro-core monitoring apparatus according to the embodiment shown in FIG. 2.

FIG. 3 is a timing diagram illustrating operations of the multiple micro-core monitoring apparatus according to an embodiment of the present invention, e.g., the embodiment depicted in FIG. 2.

Referring to FIG. 3, the watchdog 200 receives clear signals from a plurality of micro-cores ($100\_1$~$100\_n$) according to time division multiplexing.

The micro-cores ($100\_1$~$100\_n$) have unique clear sections (A~C) requisite for clear-signal transmission, respectively. The micro-cores ($100\_1$~$100\_n$) may output clear signals to the watchdog 200 during the clear sections (A~C), respectively.

In particular, the watchdog 200 receives a clear signal from the first micro-core ($100\_1$) during a micro-core-1 clear section A, receives a clear signal from the second micro-core ($100\_2$) during a micro-core-2 clear section B, and then receives a clear signal from the n-th micro-core ($100\_n$) during a micro-core-N clear section C.

In this case, the clear signals applied to the watchdog 200 for a predetermined time ranging from the micro-core-1 clear section A to the micro-core-N clear section C have different waves of pulses so as to discriminate between respective micro-cores.

For example, the clear signals output from the micro-cores ($100\_1$~$100\_n$) may have a different number of pulses or a different pulse width, etc. The micro-cores ($100\_1$~$100\_n$) output different clear signals having unique pulse waves to the watchdog 200, and transmit specific information indicating that the processing operation is being executed without any errors.

Figure 4:
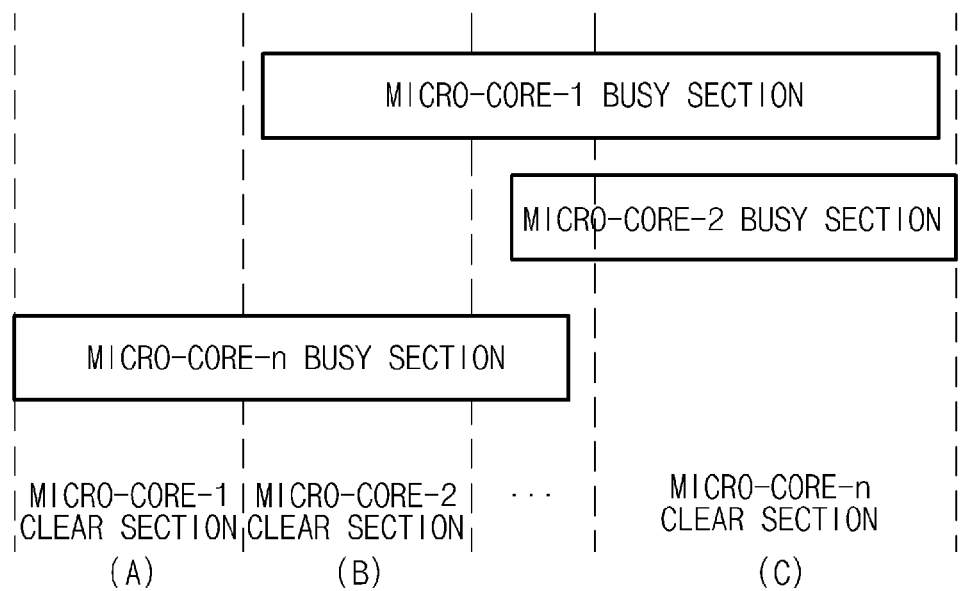
FIG. 4 is a conceptual diagram illustrating a clear section of multiple micro-cores shown in FIG. 2.

FIG. 4 is a conceptual diagram illustrating a clear section of multiple micro-cores ($100\_1$~$100\_n$) shown in FIG. 2.

Referring to FIG. 4, allocation of the clear sections (A~C) is carried out in which the clear signals are transmitted to the exclusion of a specific section in which the micro-cores ($100\_1$~$100\_n$) are busiest in operation.

In particular, the specific section in which the n-th micro-core ($100\_n$) is busiest in operation corresponds to the micro-core-1 clear section A and the micro-core-2 clear section B. Accordingly, the clear signals of the relatively less busy micro-cores ($100\_1$, $100\_2$) are transferred to the watchdog 200 during the clear sections (A, B).

The busiest section of the first micro-core ($100\_1$) may correspond to the micro-core-2 clear section B and the micro-core-N clear section C. Accordingly, the clear signals of the relatively less busy micro-cores ($100\_2$, $100\_n$) are transferred to the watchdog 200 during the clear sections (B, C).

In addition, the busiest section of the second micro-core ($100\_2$) may correspond to the micro-core-(n−1) clear section and the micro-core-n clear section C. Accordingly, the clear signal of the relatively less busy micro-core ($100\_n$) is transferred to the watchdog 200 during the clear section C.

As described above, the multiple micro-core monitoring apparatus according to the embodiment controls the clear signals to be transferred to the watchdog 200 to the exclusion of a specific section in which the micro-cores (100_1~100_n) are busiest in operation. As a result, the above-mentioned multiple micro-core monitoring apparatus can control the watchdog 200 to perform the monitoring operation without affecting the important operations of the micro-cores (100_1~100_n).

Figure 5:
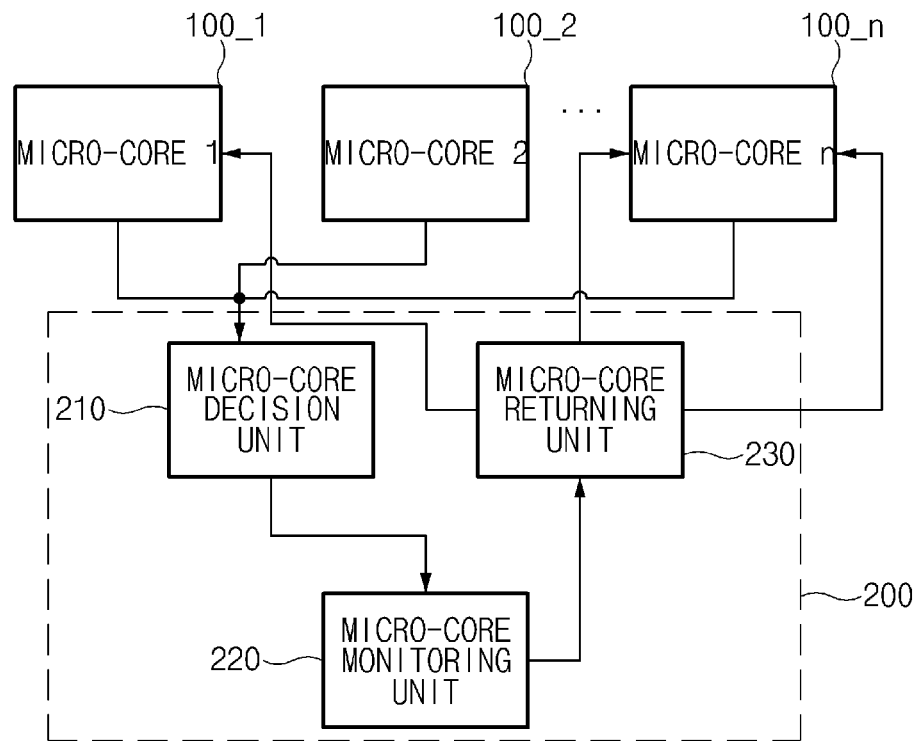
FIG. 5 is a detailed block diagram illustrating the watchdog of FIG. 2.

FIG. 5 is a detailed block diagram illustrating the watchdog 200 of FIG. 2.

Referring to FIG. 5, the watchdog 200 includes a micro-core decision unit 210, a micro-core monitoring unit 220, and a micro-core returning unit 230.

The micro-core decision unit 210 stores information regarding the clear sections (A~C) respectively allocated to the micro-cores (100_1~100_n).

The micro-core decision unit 210 receives the clear signals from the micro-cores (100_1~100_n) at different times. The micro-core decision unit 210 determines which one of the clear sections (A~C) is associated with the received clear signal, and transmits clear information regarding the corresponding micro-core to the micro-core monitoring unit 220.

Upon receiving the clear information from the micro-core decision unit 210, the micro-core monitoring unit 220 monitors whether the micro-cores (100_1~100_n) operate normally.

The micro-core monitoring unit 220 stores information regarding the clear sections (A~C) of the micro-cores (100_1~100_n).

If the micro-core monitoring unit 220 does not receive the clear signal from the corresponding micro-core during each clear section (A~C), the micro-core monitoring unit 220 determines the presence of an error in the corresponding micro-core. In contrast, if the micro-core monitoring unit 220 receives the clear signal from the corresponding micro-core during each clear section (A~C), the micro-core monitoring unit 220 determines that all the micro-cores (100_1~100_n) operate normally.

In addition, the micro-core monitoring unit 220 transmits the monitoring result of the micro-cores (100_1~100_n) to the micro-core returning unit 230.

If an error has occurred in at least one of the micro-cores (100_1~100_n) during each clear section (A~C), the micro-core returning unit 230 recovers the corresponding error, and outputs a reset signal to the corresponding micro-core.

In this case, the micro-core returning unit 230 is independently coupled to each of the micro-cores (100_1~100_n). Accordingly, if a reset signal is output to any erroneous micro-core, the remaining micro-cores other than the erroneous micro-core are not affected by the reset signal.

Figure 6:
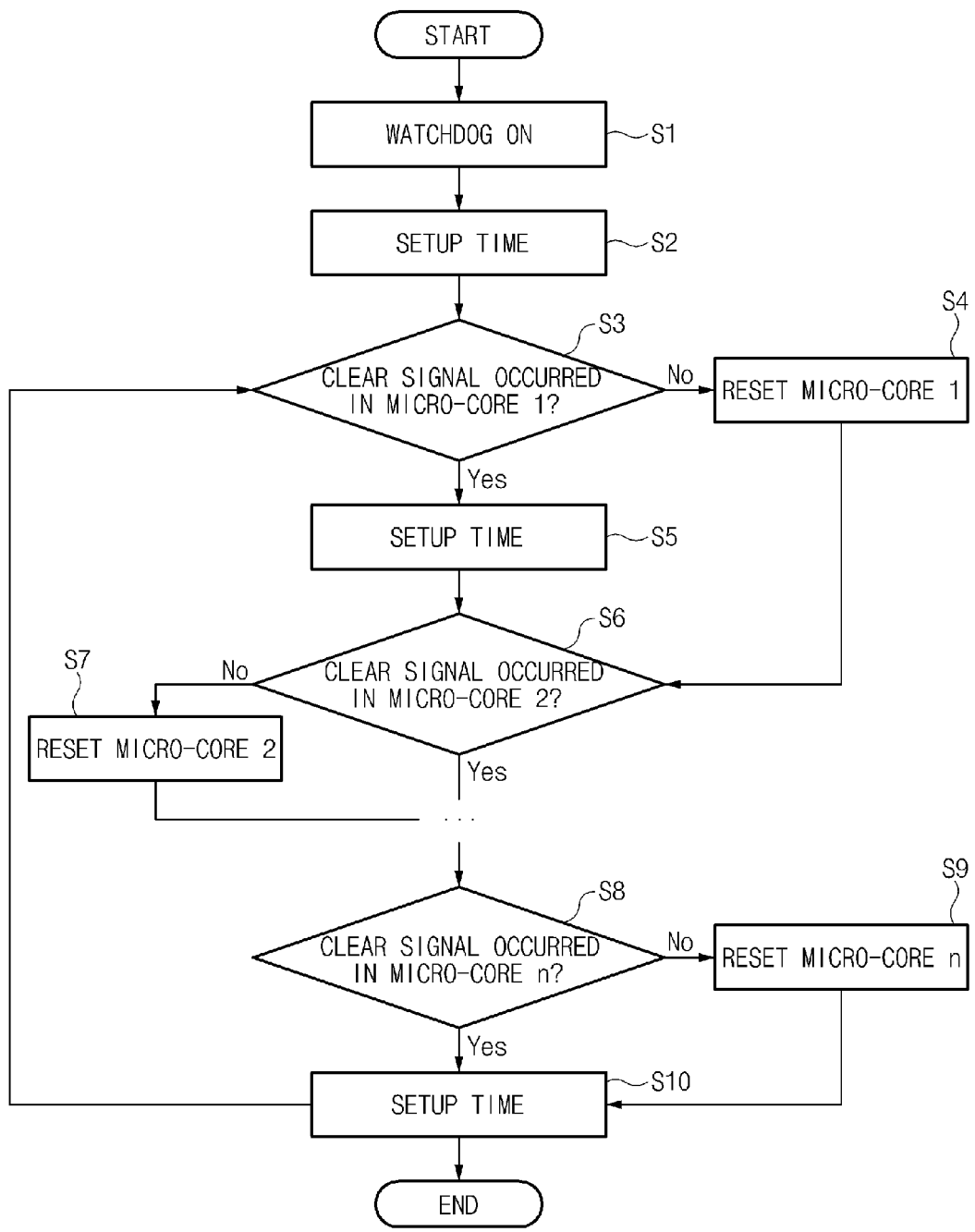
FIG. 6 is a flowchart illustrating operations of the watchdog shown in FIG. 5.

FIG. 6 is a flowchart illustrating operations of the watchdog 200 shown in FIG. 5.

Referring to FIG. 6, the watchdog 200 is turned on in step S1.

The watchdog 200 receives a clear signal from the micro-core (100_1) during a predetermined time established in the clear section A of the first micro-core (100_1) in step S2. The micro-core decision unit 210 outputs clear information of the micro-core (100_1) to the micro-core monitoring unit 220 during a predetermined time established in the clear section A.

The micro-core monitoring unit 200 determines whether the clear signal occurs normally in the first micro-core (100_1) in step S3.

If the clear signal occurs normally in the first micro-core (100_1) during the clear section A, the micro-core monitoring unit 200 goes to the next step. In contrast, if the clear signal occurs abnormally in the first micro-core (100_1) during the clear section A, the micro-core monitoring unit 230 determines the presence of an error in the first micro-core (100_1) and transmits this error information to the micro-core returning unit 230.

Upon receiving the error information of the first micro-core (100_1), the micro-core returning unit 230 restores and resets the first micro-core (100_1) in step S4.

Subsequently, the watchdog 200 receives a clear signal from the second micro-core (100_2) during a predetermined time established in the clear section B of the second micro-core (100_2) in step S5. The micro-core decision unit 210 outputs clear information of the micro-core (100_2) to the micro-core monitoring unit 220 during a predetermined time established in the clear section B.

The micro-core monitoring unit 200 determines whether the clear signal occurs normally in the second micro-core (100_2) in step S6.

If the clear signal occurs normally in the second micro-core (100_2) during the clear section B, the micro-core monitoring unit 200 goes to the next step. In contrast, if the clear signal occurs abnormally in the second micro-core (100_2) during the clear section B, the micro-core monitoring unit 230 determines the presence of an error in the second micro-core (100_2) and transmits this error information to the micro-core returning unit 230.

Upon receiving the error information of the second micro-core (100_2), the micro-core returning unit 230 restores and resets the second micro-core (100_2) in step S7.

Subsequently, the watchdog 200 receives a clear signal from the n-th micro-core (100_n) during a predetermined time established in the clear section C of the n-th micro-core (100_n). The micro-core decision unit 210 outputs clear information of the micro-core (100_n) to the micro-core monitoring unit 220 during a predetermined time established in the clear section C.

The micro-core monitoring unit 200 determines whether the clear signal occurs normally in the n-th micro-core (100_n) in step S8.

If the clear signal occurs normally in the n-th micro-core (100_n) during the clear section C, the micro-core monitoring unit 200 goes to the next step. In contrast, if the clear signal occurs abnormally in the n-th micro-core (100_n) during the clear section C, the micro-core monitoring unit 230 determines the presence of an error in the n-th micro-core (100_n) and transmits this error information to the micro-core returning unit 230.

Upon receiving the error information of the n-th micro-core (100_n), the micro-core returning unit 230 restores and resets the n-th micro-core (100_n) in step S9. The micro-core decision unit 210 determines a setup time of the next clear signal in step S10.

As is apparent from the above description, the multiple micro-core monitoring apparatus according to the embodiments can integrate a plurality of watchdogs configured to monitor multiple micro-cores into one watchdog so as to reduce the size of a semiconductor device, resulting in reduction of production costs.

If one watchdog monitors multiple micro-cores, the multiple micro-core monitoring apparatus according to the embodiments recognizes which micro-core encounters an error or problem, and resets only the erroneous micro-core so as to implement efficient error checking, resulting in a guarantee of reliability.

In addition, the multiple micro-core monitoring apparatus according to the embodiments recognizes the presence or absence of an error in each micro-core, and selects and resets only the erroneous micro-core, such that it is not necessary to initialize again overall micro-core operations, resulting in reduction of an initialization time.

In accordance with the embodiments, each micro-core is configured to perform a clear operation using a time division multiplexing, and a clear section of the corresponding micro-core is allocated to a specific section in which each micro-core is least busy, such that the clear operation does not affect the important operations of the micro-cores.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A multiple micro-core monitoring apparatus comprising:
   a plurality of micro-cores configured to periodically output clear signals having different pulse waves; and
   a watchdog configured to respectively receive the clear signals having different pulse waves so as to determine presence or absence of an error in the micro-cores, and respectively reset an erroneous micro-core,
   wherein the clear signals generated from the micro-cores are applied to the watchdog during different clear sections according to a time division multiplexing.

2. The multiple micro-core monitoring apparatus according to claim 1, wherein the clear signals generated from the micro-cores have different numbers of pulses.

3. The multiple micro-core monitoring apparatus according to claim 1, wherein the clear signals generated from the micro-cores have different pulse widths.

4. The multiple micro-core monitoring apparatus according to claim 1, wherein the clear signals generated from the micro-cores are applied to the watchdog after excluding a specific section in which the corresponding micro-core is busy from each clear section.

5. The multiple micro-core monitoring apparatus according to claim 1, wherein the watchdog includes:
   a micro-core decision unit configured to determine which clear section is used for reception of each clear signal received from the micro-cores;
   a micro-core sensing unit configured to detect whether the clear signal from the micro-core decision unit is received from the corresponding micro-core within a predetermined clear section so as to determine the presence or absence of an error in the micro-core; and
   a micro-core returning unit configured to restore and reset an erroneous micro-core in response to an output signal of the micro-core sensing unit.

6. A multiple micro-core monitoring apparatus comprising:
   a micro-core decision unit configured to determine which clear section is used for reception of each clear signal received from a plurality of micro-cores;
   a micro-core sensing unit configured to detect whether the clear signal from the micro-core decision unit is received from the corresponding micro-core within a predetermined clear section so as to determine presence or absence of an error in the micro-core; and
   a micro-core returning unit configured to restore and reset an erroneous micro-core in response to an output signal of the micro-core sensing unit,
   wherein the micro-core decision unit receives the clear signals from the micro-cores during different clear sections according to a time division multiplexing.

7. The multiple micro-core monitoring apparatus according to claim 6, wherein the clear signals generated from the micro-cores have different numbers of pulses.

8. The multiple micro-core monitoring apparatus according to claim 6, wherein the clear signals generated from the micro-cores have different pulse widths.

9. The multiple micro-core monitoring apparatus according to claim 6, wherein the clear signals received from the micro-cores are applied to the micro-core decision unit after excluding a specific section in which the corresponding micro-core is busy from each clear section.

10. A multiple micro-core monitoring method comprising:
    periodically receiving clear signals having different pulse waves from a plurality of micro-cores;
    respectively receiving the clear signals having different pulse waves, and determining whether the clear signals are input to a predetermined section, thereby determining presence or absence of an error in the micro-cores; and
    restoring and resetting an erroneous micro-core from among the micro-cores,
    wherein the clear signals generated from the micro-cores are input during different clear sections according to a time division multiplexing.

* * * * *